United States Patent [19]
Seaton

[11] 3,750,162
[45] July 31, 1973

[54] ALARM SYSTEM
[75] Inventor: William Joe Seaton, Kearns, Utah
[73] Assignee: Garside Corporation, Salt Lake City, Utah
[22] Filed: July 23, 1970
[21] Appl. No.: 57,664

[52] U.S. Cl. .............................................. 343/5 PD
[51] Int. Cl. ............................................. G01s 9/02
[58] Field of Search ............................ 343/5 PD, 14

[56] References Cited
UNITED STATES PATENTS

| | | | |
|---|---|---|---|
| 3,512,155 | 5/1970 | Bloice | 343/5 PD |
| 3,626,412 | 12/1971 | Buckley | 343/5 PD |
| 3,149,330 | 9/1964 | Flocco | 343/14 |
| 3,378,834 | 4/1968 | Corbell | 343/5 PD |
| 2,545,503 | 3/1951 | Tucker | 343/5 PD |

Primary Examiner—Benjamin A. Borchelt
Assistant Examiner—G. E. Montone
Attorney—E. F. Jaros, C. A. Miketta, W. W. Glenny, W. Poms, G. P. Smith, G. E. Lande and P. E. Adams

[57] ABSTRACT

An alarm system the operation of which is controlled by a key switch and, if desired, by a seven-button decoder. Several abnormality detecting devices are connected to a system control. The detecting devices may consist of a wide variety of sensors, two types of which are mentioned in this specification. Upon receipt of an alarm signal from a detecting device, some of the system control circuitry interrogates that signal and, as a function of that signal, actuates the output circuitry of the system control. The illustrated output circuitry specifically comprises an audio oscillator and a light blinking circuit to provide both audio and visual alarm outputs.

2 Claims, 8 Drawing Figures

INVENTOR.
WILLIAM JOE SEATON
BY
ATTORNEY

ALARM SYSTEM

BACKGROUND

1. Field of Invention

The present invention relates generally to alarm systems and more specifically to a self contained alarm system comprising an alarm output unit which is coupled with various sensors for detection of abnormal disturbances within a closed structure and capable of producing alarm outputs following detection of the abnormal disturbances.

2. The Prior Art

The prior art burglar alarms of the radar type known to me have serious limitations. For example, the distance between the control unit and the radar sensor is limited because of the voltage drops encountered in long wires. Moreover, such prior art systems of the volume surveillance type make no provision for sorting relevant from irrelevant signals; therefore the alarm device is initiated by any signal, caused by movement, resulting in frequent "false alarms."

Also, alarm systems of this type have not been developed with the home owner in mind and are, therefore, not adapted to best serve the needs of the home owner nor to match his economic ability to purchase. Other disadvantages of the prior art exist.

BRIEF DESCRIPTION AND OBJECTS OF THE INVENTION

The present alarm system invention, including apparatus and methods, provides a novel system for detecting and reporting abnormalities within a closed vicinity. The detection of an abnormal disturbance, such as, but not limited to, a fire or burglary, by one or more of the various sensors within the closed vicinity causes an alarm signal to be developed. The alarm signal then actuates a control unit, which comprises alarm circuitry and which activates one or more alarm devices.

It is a primary object of the present invention to provide a novel alarm system, including apparatus and methods.

Another paramount object of the invention is to provide novel electrical structure to interrogate and discern between irrelevant and relevant signals, which are allowed to actuate alarm circuitry.

Another dominant object of this invention is the provision of novel sensing structure for an alarm system which surveys a predetermined volume.

Another significant object of the present invention is to provide a novel radar surveillance system specifically designed for household and like uses.

An additional important object of this invention is the provision of a unique time delay alarm activation device.

It is also a primary object of this invention to provide novel method and means for acheiving abnormality alarm outputs.

These and other objects and features of the present invention will become more fully apparent from the following description and appended claims taken in conjunction with the accompanying drawings.

DETAILED DESCRIPTION OF THE ILLUSTRATED EMBODIMENT

Sensor Detector Network

The purpose of the sensor detector network 20 is to selectively filter electronic signals delivered to it by a radar sensor 18 so as to discriminate between various input signals, some caused by an abnormal activity desired to be detected and some caused by irrelevant activity.

Figure 3:
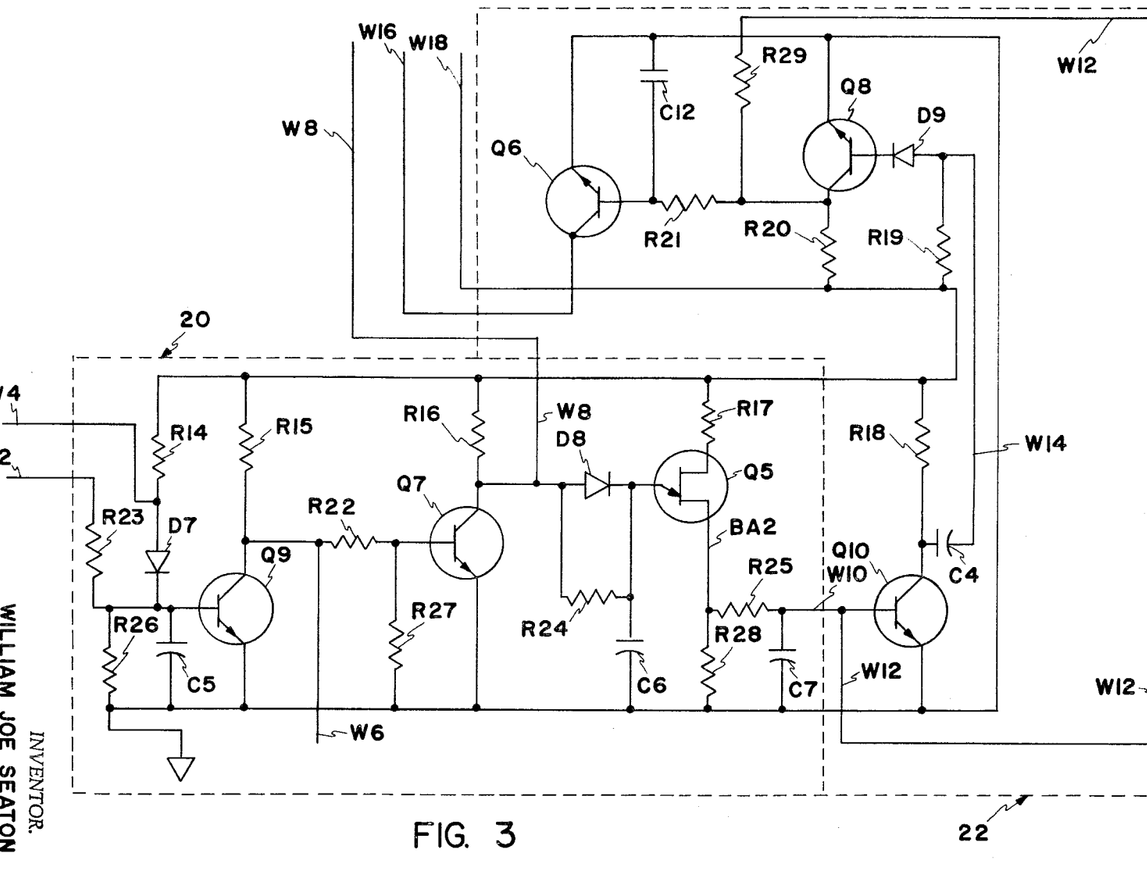
FIG. 3 is a schematic diagram of the sensor detector circuit and the alarm timing circuit of the system control.

With reference to FIG. 3, the operation of the sensor detector network 20 will be explained. The input to network 20 is delivered from the radar sensor 18 via wire W2 through resistor R23 to the base of transistor Q9. Biasing of transistor Q9 is provided by resistors R14 and R26.

Diode D7 blocks the negative voltage of protective interlock wire W4 from draining the positive signals delivered via wire W2 to ground.

In operation, as the base of transistor Q9 is positively biased by the input from the radar sensor 18 (whenever a specific type of movement is sensed by the radar sensor 18), the collector of transistor Q9 is driven negative. This negative signal is delivered via resistor R22 to the base of transistor Q7 which is biased by resistors R15, R22 and R27. A load is provided by resistor R16. Some of the negative signal supplied by the collector of transistor Q9 is delivered to wire W6, which connects to both the light blinker circuit 28 and the tone inhibit circuit 24, which circuits will be explained later. As the base of transistor Q7 is driven negative by transistor Q9, the collector of transistor Q7 is driven positive. This positive voltage can be controlled by wire W8, which is connected to the key switch delay network 32, which network will be explained later.

The positive signal at the collector of transistor Q7 is connected to the anode of diode D8 and is used to charge a capacitor C6, which is connected to the emitter of unijunction transistor Q5. Resistor R24 is arranged to provide a discharge path to ground for capacitor C6 when no signal exists at the collector of transistor Q7. By correctly selecting the size of capacitor C6 and resistor R24 it is possible to select various forms of pulses that are capable of causing the unijunction transistor Q5 to conduct, whereas other forms of pulses would not cause transistor Q5 to conduct. Thus, resistor R24 and capacitor C6 are critical elements, selected to react only to specific types of signals supplied by the collector of transistor Q7, originally emanating from the radar sensor 18. Unijunction transistor Q5 is provided with a load by resistors R17 and R28.

The output of the sensor detector network 20 comes from base BA2 of unijunction transistor Q5 after traveling through a pulse shaping network comprising resistor R25 and capacitor C7 and is delivered from network 20 by wire W10.

Alarm Timing Circuit

With continued reference to FIG. 3, the alarm timing circuit 22 provides an output, the duration of which is about 17 seconds, upon receipt of an input from the sensor detector network 20.

The input to the alarm timing circuit 22 is delivered, as mentioned above, by wire W10 to the base of transistor Q10. This signal is positive-going and causes transistor Q10 to conduct and, as a result, discharge capacitor C4 to ground. Resistor R18 provides a load for transistor Q10. As capacitor C4 is discharged, the voltage on wire W14 is lowered toward ground potential. This potential is subject to positive buildup because of resistor R19, which is located between the positive voltage supply and capacitor C4. The resistor R19 and capacitor C4 togehter provide a time delay network which requires approximately 17 seconds to charge. As the delay network composed of capacitor C4 and resistor R19 reaches a predetermined positive voltage at wire W14 (which voltage is applied through diode D9 to the base of transistor Q8), transistor Q8 will conduct. As the base of transistor Q8 is driven positive, the collector is driven negative, due to the placement of load resistor R20. Part of the signal voltage on the collector of transistor Q8 is delivered to resistor R29. Resistor R29 then delivers the signal voltage to wire W12. The signal on wire W12 is then fed back to the base of transistor Q10 so as to sustain transistor Q10 in cut off.

The voltage on the collector of trnasistor Q8 will be positive concurrent in time from the beginning of the initiation of input to the alarm timing circuit 22 from the sensor detector network 20 to the time when the delay network composed of capacitor C4 and resistor R19 has reached the predetermined positive charge. This positive signal is applied through matching resistor R21 to the base of transistor Q6. Capacitor C12 helps stabilize the voltage and voltage changes at the base of transistor Q6. The output of the alarm timing circuit 22 is delivered from the collector of transistor Q6 to wire W16 and is negative-going. Wire W16 then connects to relay RY1 of FIG. 4. Wire W18 connects to the power supply of circuit 30 shown in FIG. 4.

Tone Inhibit Circuit

With specific reference to FIG. 5, the tone inhibit circuit 24 will be explained. The tone inhibit circuit 24 is supplied with an input from the sensor detector network 20 and controls the output of the audio oscillator 26. The input to the tone inhibit circuit 22 is delivered via wire W6, which is connected to the collector of transistor Q9 of FIG. 3. The signal carried by wire W6 is connected to resistor R31 of FIG. 5 from which the signal is delivered to the base of transistor Q16. This signal is negative-going and causes transistor Q16 to cut off the collector current. This decrease in collector current at transistor Q16 increases the collector potential as a result of the biasing and loading on transistor Q16 caused by resistors R42 and R32, respectively. The mentioned positive voltage on the collector of transistor Q16 is applied through diode D10 to a pulse stabilizing network comprising capacitor C11 and resistor R41. Resistor R41 then delivers the output signal of the tone inhibit circuit 24 to wire W20. Wire W20 is connected to the audio oscillator 26.

Audio Oscillator

Figure 5:
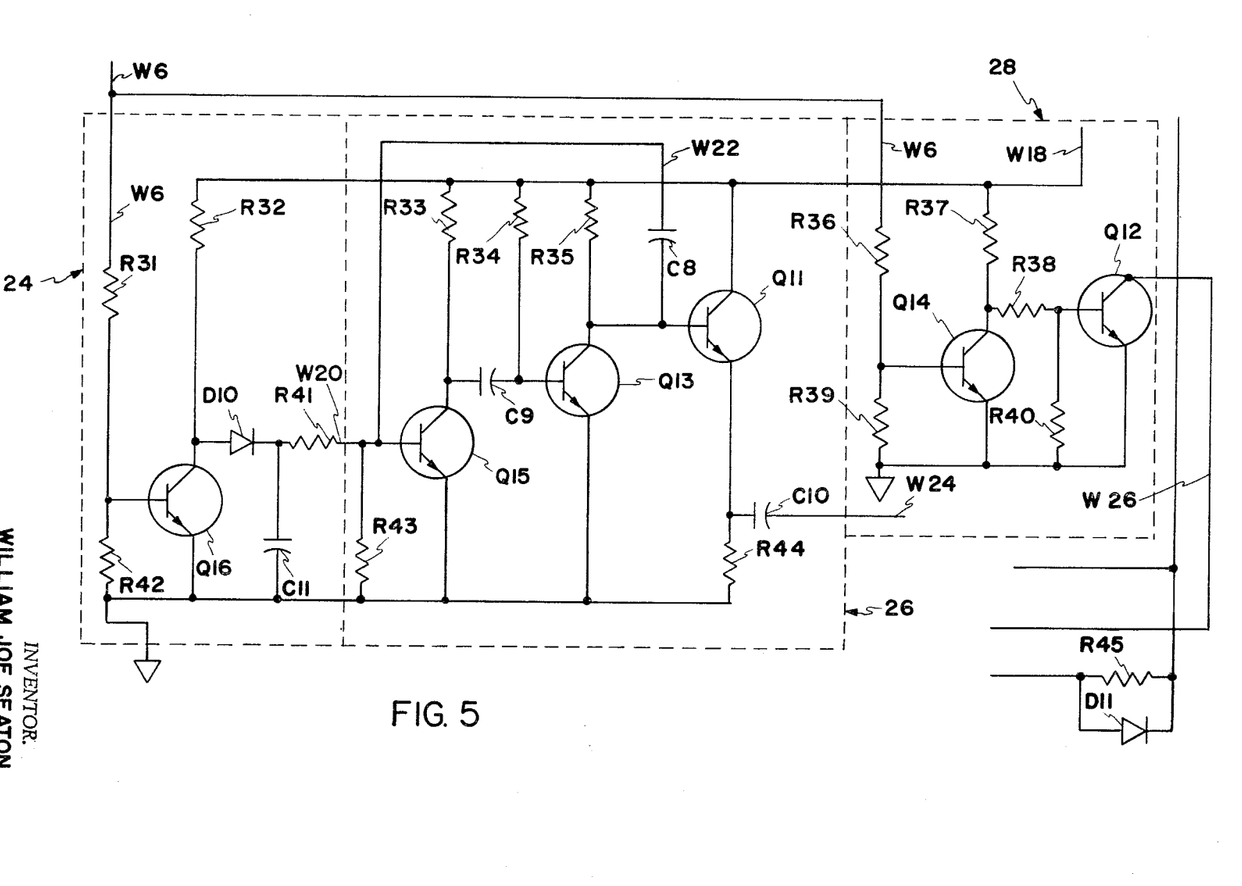
FIG. 5 is a schematic diagram of tone inhibit circuit, audio oscillator circuit and light blinker circuit of the system control.

With reference to FIG. 5, the operation of the audio oscillator 26 will be explained. The audio oscillator 26 provides an audio oscillation output upon signal input from the tone inhibit circuit 24. The function of the audio oscillator 26 is to provide an audible tone whenever abnormal movement is detected by the radar sensor 18.

Figure 2:
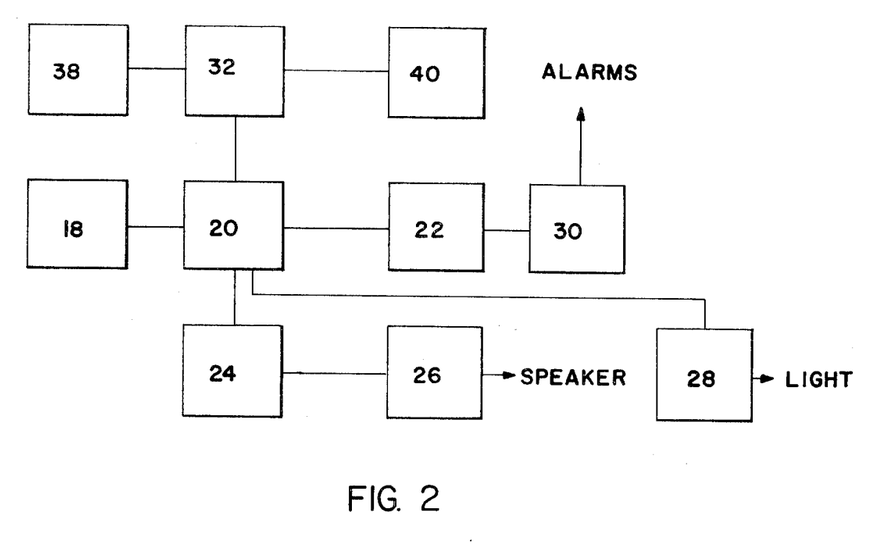
FIG. 2 is a block diagram of the circuitry of the system control system of FIG. 1.

The input to the audio oscillator 26 is delivered via wire W20 to the base of transistor Q15. This input is positive-going and increases the voltage on the base of transistor Q15. Transistor Q15 is coupled to transistor Q13 by capacitor C9. The output of transistor Q13 is coupled back to the input of transistor Q15 via wire W22 and capacitor C8. As a result of the previously-described arrangement and the biasing and loading of resistors R33, R34 and R35, the network comprising transistors Q15 and Q13 will oscillate. The oscillating voltage at the collector of transistor Q13 is connected to the base of transistor Q11. Transistor Q11 is used to amplify the signal at the collector of transistor Q13. Resistor R44 loads transistor Q11 and enables capacitor C10 to deliver an output signal to wire W24 during oscillation. Wire W24 is connected to an audio speaker (FIG. 2).

Blinker Circuit

With reference to FIG. 5, the operation of the blinker circuit 28 will be explained. The blinker circuit 26 is supplied with an input from the sensor detector network 20, delivered via wire W6, which is connected to the collector of transistor Q9 of FIG. 3. The function of the blinker circuit 28 is to provide a visual output every time the sensor detector network 20 is triggered by the radar sensor 18 so that a visual indication of abnormal movement in the electromagnetic field of the radar sensor 18 can be provided.

Wire W6 delivers the input signal across resistor R36 to the base of transistor Q14. Transistor Q14 is biased by resistor R39 and loaded by resistor R37. As the negative-going signal (as opposed to the positive signal normally carried by wire W6) is applied to the base of transistor Q14, a positive-going signal is generated at the collector of transistor Q14. This positive signal is delivered by resistor R38 to the base of transistor Q12. Transistor Q12 is biased by resistor R40 and is caused to conduct upon receiving an input signal from resistor R38. The collector of transistor Q12 is connected to wire W26 and is allowed to approach ground potential upon signal input from resistor R38. As a result, when and if wire W26 is connected to a visual indicator, that indicator will be operative whenever there is signal input from the sensor detector network 20.

Power Supply and Alarm Actuation Relay

With specific reference to FIG. 4, the structure and operation of the power supply and alarm actuation relay will be explained. The power supply and alarm actuation relay circuit 30, supplies power to the system control (FIG. 1) and to some alarm indicator devices.

As previously stated, wire W16 supplies power to relay RY1 as the alarm timing circuit 22 is turned on. The position of the switches of relay RY1 is shown in the deenergized state; that is the switches will travel to the opposite terminals upon signal input from the alarm timing circuit 22.

Wires W39 and W40 connect to household or other suitable power and supply power to the primary of transformer T1 after traveling through switch S1 and fuse F1. The secondary of transformer T1 is center tapped and is used to drive a full wave bridge DB2 and a full-wave center tap bridge DB1 as well. Whenever transformer T1 is receiving power, lamp L1 will be energized through a circuit originating at the center tap of the secondary of transformer T1 traveling through lamp L1 and then to one of the A.C. inputs of diode bridge DB2.

Diode bridge DB1 is connected across the secondary of transformer T1 and used to charge an auxiliary power supply (FIG. 1) through resistor R1 and wire W28. Diode D1 allows the mentioned auxiliary power supply to supply power to the bell during power failure without passing through resistor R1.

Figure 1:
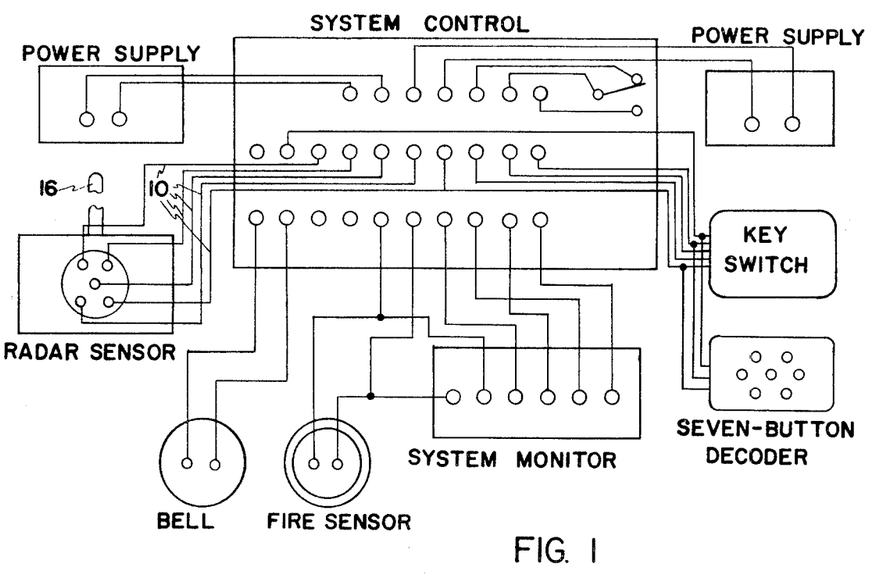
FIG. 1 is a diagrammatic illustration of a presently preferred alarm system according to the present invention intended for household and like uses.

Diode bridge DB1 also powers lamp L2 whenever relay RY1 is energized by a circuit originating at the anode of diode bridge DB1 traveling through the appropriate switch of relay RY1, through lamp L2 and then to the center tap of the secondary transformer T1. Diode bridge DB1 also supplies power to the fire sensor, one end of which is connected to wire W30. The other terminal of the fire sensor is connected to wire W32 which is connected to an auxiliary bell (FIG. 1). If the fire sensor is operated, i.e., if the sensor actuates at a specified temperature and that temperature is exceeded, wires W30 and W32 will be electrically connected together at the fire sensor. If the wires are so electrically connected, the voltage of wire W30 is applied to wire W32 and subsequently to the auxiliary bell. This causes the bell to ring. If relay RY1 is energized, by the radar sensor 18, the voltage at wire W30 will in the same manner be applied to wire W32 and the bell will be caused to operate. The second of the two bell connections is connected to wire W38, which connects to the center tap of transformer T1. Diode D2 is connected across wires W32 and W38 to provide a transient leakage path for the inductive coils (not shown) found in the bell.

The remaining contacts of relay RY1 are connected to wires W35, W36 and W37, respectively. They are provided as a convenience for the switching of auxiliary alarm units (not shown).

The part of the power supply that supplies power to the home alarm unit consists of a voltage regulator VR1, an overload protection transistor Q4 and various circuit stabilizing and biasing components. The voltage regulator VR1 is connected to the anode of diode bridge DB2 and is stabilized by capacitor C2 and C3. Voltage regulator VR1 protects the system control circuitry by properly biasing transistor Q4 whenever a maximum amount of current has been surpassed. Transistor Q4 has no affect on the circuit when this current maximum has not been exceeded. Resistors R9, R10, R11, R12, and R13 are used to provide proper biasing and loading of various power supply components. Wire W18 supplies positive voltage to circuitry of the system control. Wire W42 supplies the positive voltage of the power supply to external circuitry (not shown), if desired.

Key Switch Delay Network

Figure 4:
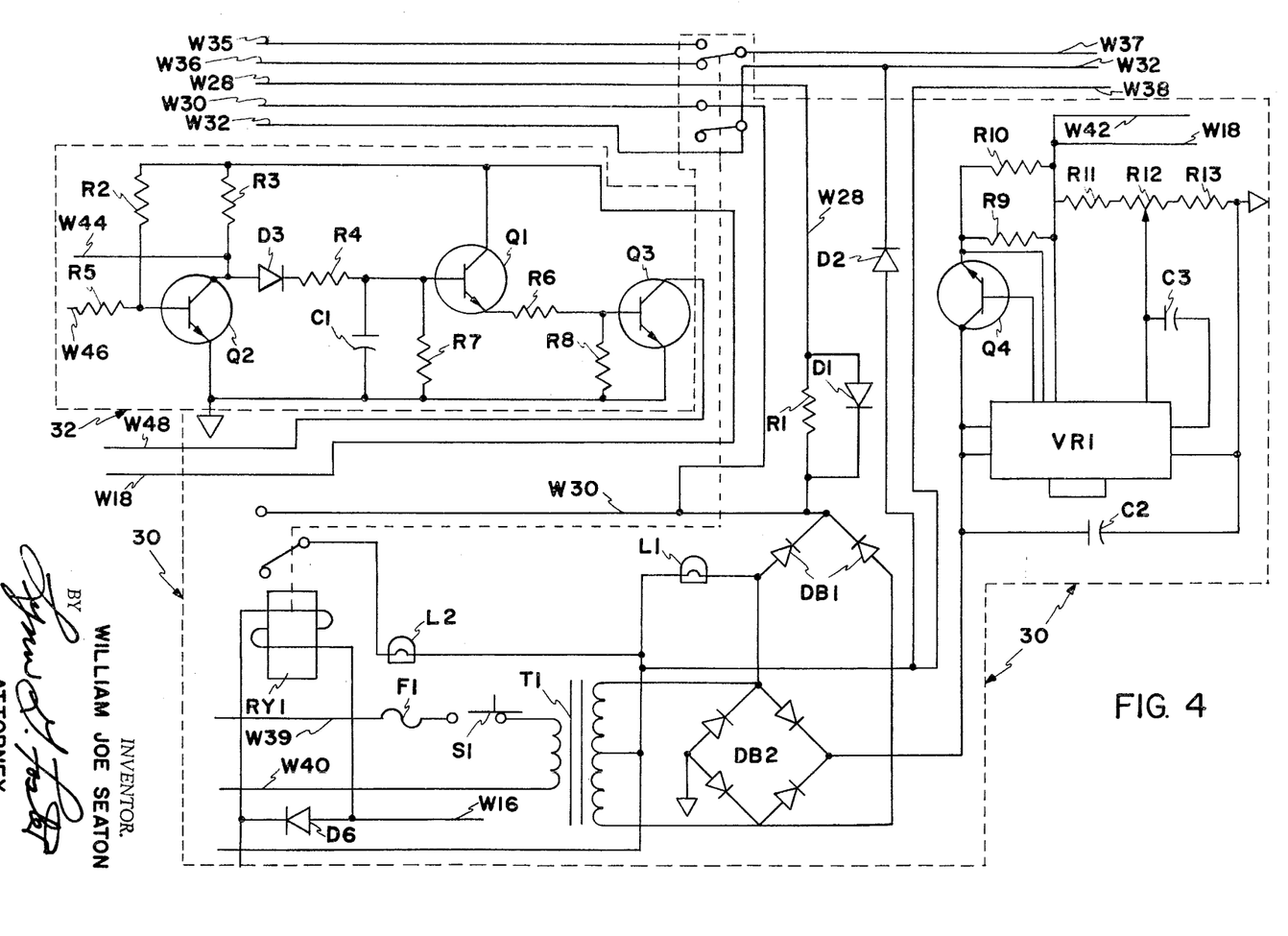
FIG. 4 is a schematic diagram of the power supply and alarm actuation relay circuit and the key switch delay network of the system control.

The key switch delay network, shown in FIG. 4, is controlled by the key switch 38 and delays the activation of the system control (FIG. 1) for a short period of time, for example, about 2 minutes to allow the user to evacuate the area under surveillance.

Input to network 32 is delivered from the key switch 38 by wire W46. Positive voltage is supplied to the key switch delay network 32 via wire W18. Wire W46 connects to resistor R5 and supplies a signal from the key switch 38 to the base of transistor Q2. Transistor Q2 is positively biased by resistor R2 and loaded by resistor R3. Wire W44 connects between the collector of transistor Q2 and a light (not shown) at the key switch 38.

Freeing the base of transistor Q2 from ground causes the collector voltage of transistor Q2 to decrease and become negative-going whenever the key switch is set so that the system control is "on." The mentioned negative-going collector voltage is blocked from transistor Q1 by diode D3, which connects, through resistor R4, to a timing delay network comprising a resistor R7 and capacitor C1. The time period required for this delay network to discharge is preferably approximately 2 minutes, although other suitable time periods could be used sufficient to allow the mentioned evacuation.

After the indicated delay time period, a positive signal (received from the power supply of circuit 30 and applied to the base of transistor Q1 through resistors R3 and R4 and diode D3 when there is not an input from the key switch) is dissipated. As the positive signal being dissipated is received at the base of transistor Q1, the emitter of transistor Q1, being connected to resistors R6 and R8 allows a negative signal to be applied to the base of transistor Q3, which base was previously positively-biased from the power supply.

As the base of transistor Q3 is negatively biased, the collector voltage of transistor Q3 is allowed to positively increase in potential. The collector of transistor Q3 is the output connection for the key switch delay network 32 and delivers electrical output signals via wire W48 to the sensor detector network 20.

Fire or Heat Sensor

The fire or heat sensors (shown in FIG. 1), intended for use in conjunction with the present alarm system, may be any one of a wide variety of commercially available types. If the operation of the fire or heat sensor closes electrical contacts upon actuation, the sensor is acceptable for system connection. The "Fire Detector," catalog number 241, distributed by the Edwards Company of Norwork, Conn. is presently preferred.

Key Switch

The key switch 38 is used to activate and deactivate the present alarm system at the user's discretion.

Figures 7, 8:
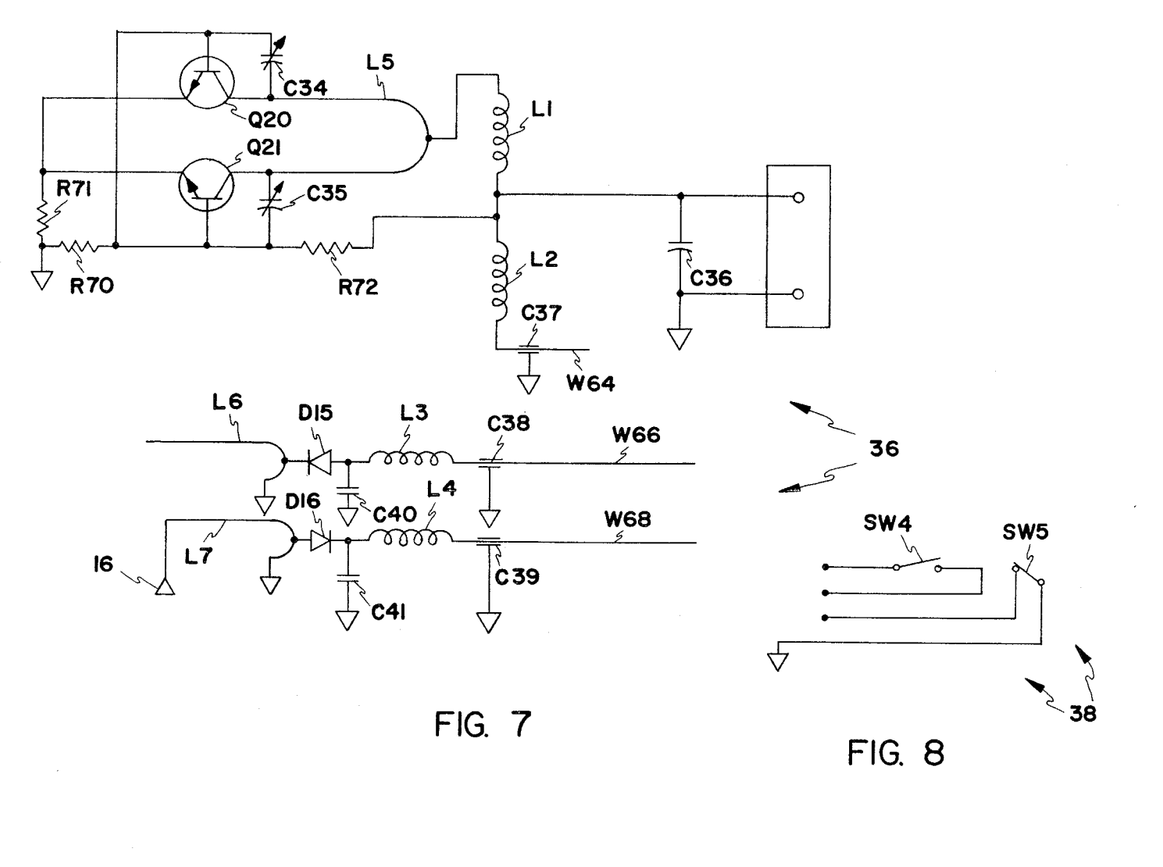
FIG. 7 is a schematic diagram of oscillator circuit of the radar sensor.
FIG. 8 is a schematic diagram of the key switch of the system.

The key switch 38 is diagrammed in FIG. 8 and comprises a key operated switch SW5, and a microswitch SW4. The microswitch SW4 is mounted in the mounting box of the key switch 38 and arranged to be open when the face plate (not shown) of switch box is removed to actuate alarm circuitry in the system control. Switch SW5 is mounted in the face plate of the key switch 38 so as to provide external access for a key.

Seven-Button Decoder

The seven-button decoder 40 (FIG. 1), when and if used, is mounted external to the area being protected by any and all of the radar sensors 18. The seven-button decoder 40 is used to temporarily inhibit the system control from initiating any alarm signal for a short period of time, such as approximately 2 minutes. During the afore-mentioned 2 minute time period, the user has time to enter the protected area and "turn off" the alarm system by turning the key switch 38 with a key. The structure and operation of the seven-button decoder is set forth in copending U. S. Pat. application Ser. No. 29,977, filed Apr. 20, 1970 and owned by the assignee of the present application.

Radar Sensor

General

Figure 6:
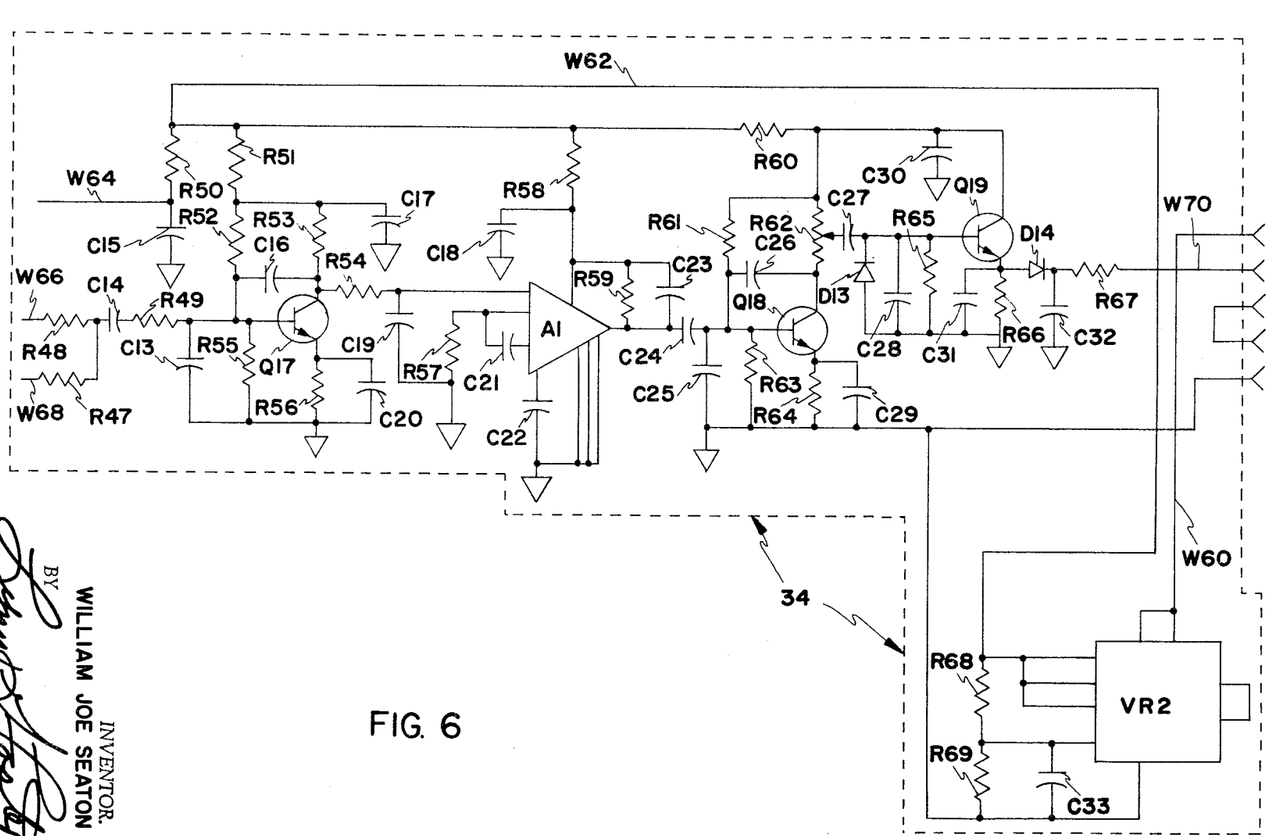
FIG. 6 is a schematic diagram of the voltage amplification and regulation circuit of the radar sensor.

The presently preferred embodiment of each radar sensor 18 is composed of two separate circuits. One circuit, shown in FIG. 6, is a voltage amplificaition and regulation circuit, generally designated 34. The remaining circuit is shown in FIG. 7 and comprises a high frequency oscillator and transmitting circuit.

Power is supplied for the operation of each radar sensor 18 from the system control by part of cable 10, shown in FIG. 1. The power is first delivered to the voltage regulator VR2 of FIG. 6. After regulation, the power is applied to the oscillator circuitry of FIG. 7, which produces an electromagnetic field of near 400 megacycles. Some of the electromagnetic energy produced is inductively coupled to two parasitic antenna coils L6 and L7, also of FIG. 7. The just previously-mentioned coils are used to produce a voltage fluctuation which is amplified by the circuitry of FIG. 6. The resulting amplified signal is fed back through cable 10 to the system control of FIG. 1.

Voltage Regulator Circuit

The voltage regulator of circuit 34, shown in FIG. 6, comprises an integrated circuit VR2, two resistors R68 and R69, and a capacitor C33. Wire W60 supplies input power from the system control to VR2. VR2 accurately regulates an output voltage, which is supplied through circuit 34 to the oscillator circuit 36 via wires W62 and W64.

Oscillator Circuit

The mentioned voltage supplied through wire W64 is applied to the oscillator circuit 36 of FIG. 7. Wire W64 connects the voltage to tuned coil L5 of the oscillator through RF blocking coils L1 and L2. As the positive input voltage is applied to the middle of coil L5, either transistor Q20 or transistor Q21 begins to conduct current through its collector and emitter. As the one transistor starts to conduct, the capacitor associated with the other transistor begins to charge. For example, if transistor 21 starts to conduct, capacitor 34 begins to charge. After a short period of time, transistor Q21 will cease its conduction and transistor Q20 will begin to conduct. While transistor Q20 is conducting, capacitor C34 is dishcarging and capacitor C35 is charging. Because of the values of capacitances, inductances, and resistances encountered in the oscillator circuit 36, a specific frequency of oscillation will exit, when the circuit is powered.

Some of the oscillation energy developed in the coil L5 during operation is inductively coupled to the two parasitic coils L6 and L7. Coil L6 is completely enclosed within the housing of the radar sensor 18; however, coil L7 is not completely enclosed since it has an extending antenna 16. As a result, coil L6 has an environment which is completely controlled by the field of coil L5 and outside factors, such as movement of human beings and the like, have no affect on coil L6. Coil L7, on the other hand, is affected by such movements. The pertinent result is that the electrical properties of coil L7 change as the radiation properties of the environment immediately external of the antenna 16 of coil L6 change.

It is commonly known that external factors have a great affect upon radiation impedances of all antennas. For example, ground plane wires connected to the base of a large variety of antennas have an affect upon the input impedance of the antenna itself. Thus, the conditions outside an antenna affect the electrical properties of the antenna just as if the physical properties of the antenna were varied.

During operation of the 400 megacycle oscillator 36, parasitic coils L6 and L7 carry induced node voltages at the connection points with the diodes D15 and D16, respectively. As a result of the arrangement of the diodes, a conventional current is allowed to flow from the diode junction node of coil L6 through diode D16, high frequency blocking coil L4, resistors R47 and R48 of FIG. 6, high frequency blocking coil L3, diode D15, coil L6, the ground of coil L6, the ground of coil L7 and back to the diode junction node of coil L7.

When the radiation impedance of the antenna 16 and coil L7 is non-variant, the voltage between wires W66 and W68 is also non-variant. If, however, the external properties surrounding antenna 16 are varied, the radiation impedance properties of the antenna 16 and coil L7 are also varied. As the impedance of coil L7 is varied, the total impedance of the just previously-described current path is also varied.

If the impedance of the described current path is varied and the power being delivered is constant, the current through the total current path must also vary by the vector equation $$P = I^2 Z,$$

where $P$ is power, $I$ is current and $Z$ is impedance. If the current is so varied, the voltage between wires W66 and W68 also varies. This described voltage variation is transmitted by wires W66 and W68 to circuit 34 of FIG. 6.

Resistors R71, R70 and R72 are biasing resistors for the transistors of the oscillator circuit 36. The capacitor C36 filters the input voltage to circuit 36. Capacitors C37, C38 and C39 feed various input or output signals into or out of the chamber of oscillator circuit 36. Capacitors C40 and C41 ground the high frequency signals developed by the antenna 16 and associated circuitry so that only low frequency signals will cause alarms.

Voltage Amplifier

The voltage amplifier 34 will be explained with specific reference to FIG. 6. The input signal of the voltage amplifier 34 is supplied by wires W66 and W68 to a junction with capacitor C14. Capacitor C14 transfers the sum of the signals delivered by wires W66 and W68 to the base of transistor Q17. The signal supplied to transistor Q17 is non-polarized and, thus, biases transistor Q17 both positively and negatively from the quiescent point (Q-point). The amplified voltage variation is then transmitted from the collector of Q17 via resistor R54 to the integrated circuit amplifier A1. After the signal has been amplified by the integrated circuit A1, it is then transferred to the base of transistor Q18 through capacitor C24 for further amplification.

Potentiometer R62 is connected in the collector circuit of transistor Q18 and the output voltage from the collector of Q18 is tapped from resistor R62 by the slider of the potentiometer. This tapped voltage is again amplified by transistor Q19. The signal from the emitter of transistor Q19 becomes the output of the voltage amplifier circuit 34 upon passage through diode D14 and resistor R67. As a result of the polarization of diode D14, only positive signal elements are transmitted from the radar sensor 18 to the sensor detector network 20 via wire W70.

Additional components required for the operation of the voltage amplifier circuit 34 will be hereafter described. Resistors R60, R58, R51 and R53 are individually used to provide loads for various components of circuit 34. Biasing resistors R52, R55, R61, R63 and R65 plus the emitter stabilizing resistors R56, R64 and R66 are used in sets to control the Q-point of various ones of the circuit transistors. Resistors R49 and R67 assist capacitors C13 and C32 in stabilizing the input and output signals, respectively.

Capacitors C16 and C26 are feed back capacitors for transistors Q17 and Q18, respectively. Capacitors C24 and C27 are coupling capacitors for different stages, while capacitor C25 is a stabilizing capacitor for the input signal of transistor Q18.

Resistors R57, R58 and R59 together with capacitors C18, C19, C21, C22 and C23 are necessary for the control of the circuit parameters surrounding the integrated circuit A1.

Capacitors C20, C28, C29 and C31 increase the low frequency response of the radar sensor 18.

The invention may be embodied in other specific forms without departing from the spirit or essential characteristics thereof. The present embodiment is, therefore, to be considered in all respects as illustrative and not restrictive, the scope of the invention being indicated by the appended claims rather than by the foregoing description, and all changes which come within the meaning and range of equivalency of the claims are therefore to be embraced therein.

What is claimed and desired to be secured by United States Letters Patent is:

1. A radar sensor adapted to comprise part of an alarm system for detection of movement in a monitored volume of space, the radar sensor including external antenna means, oscillator means for producing high frequency electromagnetic radiation, shielded comparision parasitic antenna means, and means for connecting the radar sensor to a source of electrical power, the radar sensor further comprising voltage amplification means electrically connected to tap means at the external antenna means and to tap means at the comparison parasitic antenna means, the voltage amplification means sensing and amplifying variations in the difference voltage between the external antenna means and the comparison parasitic antenna means, the improvement comprising:

separate low pass filter means connecting each of said tap means to said amplification means, and said amplification means and low pass filter means being closely juxtaposed and joined by protective inner connecting means to each of said tap means for transmitting relatively low frequency difference voltages from the antenna means to the voltage amplification means without inducing stray voltage or inducing large voltage drops.

2. In a method of generating radar-derived signals at a remote sensing location including the steps of issuing electro-magnetic radiation within a monitored region from an external antenna to the sensing location, the impedance of the radiation being varied by movement within the region; developing a source of reference radiation; comparing variations in the properties of radiation associated with the external antenna with said reference radiation and developing at the sensing location a time-variant difference signal which corresponds to the variations in issuance of radiation from the external antenna caused by movement within the region; and amplifying the difference signal and transmitting said difference signal to remote alarm circuitry; the improvement in the steps of comparing and developing a difference signal comprising:

establishing time-variant node voltages on coil means provided for said external antenna and source of reference radiation respectively, establishing a current flow between said tap locations on said coil means varying in accordance with said node voltages, and selectively passing only relatiely low frequency signals in said current flow.

* * * * *